United States Patent
Brenner

(10) Patent No.: US 8,670,888 B1
(45) Date of Patent: Mar. 11, 2014

(54) DYNAMICALLY ASSISTING HYBRID VEHICLES

(71) Applicant: XL Hybrids, Boston, MA (US)

(72) Inventor: Neal Ennis Brenner, Needham, MA (US)

(73) Assignee: XL Hybrids, Boston, MA (US)

(*) Notice: Subject to any disclaimer, the term of this patent is extended or adjusted under 35 U.S.C. 154(b) by 0 days.

(21) Appl. No.: 13/920,946

(22) Filed: Jun. 18, 2013

(51) Int. Cl.
*B60L 9/00* (2006.01)

(52) U.S. Cl.
USPC .............. 701/22; 701/23; 903/930; 903/917; 903/947; 903/907; 180/65.27; 180/65.1; 318/139

(58) Field of Classification Search
USPC ............ 701/22, 123; 903/930, 917, 947, 943; 180/65.1, 65.27, 65.23; 318/139
See application file for complete search history.

(56) References Cited

U.S. PATENT DOCUMENTS

| | | |
|---|---|---|
| 1,696,599 A | 12/1928 | Forsberg |
| 1,790,634 A | 1/1931 | Arendt |
| 2,132,450 A | 10/1938 | Wolf |
| 3,493,066 A | 2/1970 | Dooley |
| 3,732,751 A | 5/1973 | Berman et al. |
| 3,874,472 A | 4/1975 | Deane |
| 3,923,115 A | 12/1975 | Helling |
| 4,042,056 A | 8/1977 | Horwinski |
| 4,233,858 A | 11/1980 | Rowlett |
| 4,305,254 A | 12/1981 | Kawakatsu et al. |
| 4,811,804 A | 3/1989 | Ewers et al. |
| 5,125,469 A | 6/1992 | Scott |
| 5,161,638 A | 11/1992 | Hirano |
| 5,267,623 A | 12/1993 | Kashiwagi |
| 5,272,939 A | 12/1993 | Markyvech et al. |
| 5,359,228 A | 10/1994 | Yoshida |
| 5,441,122 A | 8/1995 | Yoshida |
| 5,487,002 A | 1/1996 | Diller et al. |
| 5,490,063 A | 2/1996 | Genise |
| 5,558,588 A | 9/1996 | Schmidt |
| 5,627,752 A | 5/1997 | Buck et al. |
| 5,778,326 A | 7/1998 | Moroto et al. |
| 5,856,709 A | 1/1999 | Ibaraki et al. |
| 5,927,829 A | 7/1999 | Saga et al. |
| 6,176,808 B1 | 1/2001 | Brown et al. |
| 6,269,290 B1 | 7/2001 | Egami et al. |
| 6,314,347 B1 | 11/2001 | Kuroda et al. |
| 6,328,671 B1 | 12/2001 | Nakajima et al. |
| 6,356,818 B1 * | 3/2002 | Wakashiro et al. ............. 701/22 |
| 6,367,570 B1 | 4/2002 | Long, III et al. |
| 6,520,160 B2 | 2/2003 | Kojima et al. |
| 6,630,813 B2 | 10/2003 | Berels et al. |
| 6,668,954 B2 | 12/2003 | Field |

(Continued)

*Primary Examiner* — Redhwan K Mawari
(74) *Attorney, Agent, or Firm* — Fish & Richardson P.C.

(57) ABSTRACT

A system includes a computing device with memory configured to store instructions and a processor to execute the instructions for operations that include receiving information representative of an amount of energy stored over a first period of time in an energy storage device of a vehicle that includes a first propulsion system. Operations include receiving information representative of a performance measure of the vehicle for a second period of time, shorter than the first period of time, and, determining an assistance adjustment from an estimated value of stored energy from the information representative of the amount of energy stored over the first period of time. Operations include determining a level of assistance for a second propulsion system included in the vehicle from the received information representative of the performance measure, and, adjusting the level of assistance using the assistance adjustment determined from the estimated value of the stored energy.

24 Claims, 8 Drawing Sheets

(56) References Cited

U.S. PATENT DOCUMENTS

| | | |
|---|---|---|
| 6,687,581 B2 | 2/2004 | Deguchi et al. |
| 6,826,460 B2 | 11/2004 | Kittell et al. |
| 6,868,927 B2 | 3/2005 | Boll et al. |
| 7,013,205 B1 | 3/2006 | Hafner et al. |
| 7,104,347 B2 | 9/2006 | Severinsky et al. |
| 7,214,156 B2 | 5/2007 | Oliver |
| 7,258,183 B2 | 8/2007 | Leonardi et al. |
| 7,271,555 B1 | 9/2007 | Ciccone |
| 7,367,415 B2 | 5/2008 | Oliver et al. |
| 7,395,887 B2 | 7/2008 | Viergever et al. |
| 7,419,021 B2 | 9/2008 | Morrow et al. |
| 7,434,640 B2 | 10/2008 | Hughes |
| 7,434,641 B2 | 10/2008 | Takami et al. |
| 7,559,578 B2 | 7/2009 | van Leeve et al. |
| 7,610,124 B2 * | 10/2009 | Wakashiro et al. ............ 701/22 |
| 7,647,994 B1 | 1/2010 | Belloso |
| 7,647,997 B2 | 1/2010 | Oliver |
| 7,665,560 B2 | 2/2010 | Gelinas |
| 7,674,994 B1 | 3/2010 | Valerio |
| 7,681,676 B2 | 3/2010 | Kydd |
| 7,849,944 B2 | 12/2010 | DeVault |
| 7,921,950 B2 | 4/2011 | Harris |
| 7,926,387 B2 | 4/2011 | Horiuchi et al. |
| 7,954,579 B2 | 6/2011 | Rodriguez et al. |
| 8,215,442 B2 | 7/2012 | Ishii |
| 8,256,549 B2 | 9/2012 | Crain et al. |
| 8,337,359 B2 | 12/2012 | Hofbauer |
| 8,469,137 B2 | 6/2013 | Fujii |
| 2003/0010563 A1 | 1/2003 | Osuga et al. |
| 2005/0205313 A1 * | 9/2005 | Gilmore et al. ............. 180/65.2 |
| 2006/0213703 A1 * | 9/2006 | Long ........................... 180/65.2 |
| 2007/0137919 A1 | 6/2007 | Jolley |
| 2008/0213703 A1 * | 9/2008 | Shafer et al. ................. 430/319 |
| 2008/0319596 A1 | 12/2008 | Yamada |
| 2009/0015202 A1 * | 1/2009 | Miura ........................... 320/132 |
| 2009/0192660 A1 * | 7/2009 | Tamor et al. ................... 701/22 |
| 2009/0198398 A1 | 8/2009 | Yamada |
| 2009/0212626 A1 | 8/2009 | Snyder et al. |
| 2009/0223725 A1 | 9/2009 | Rodriguez et al. |
| 2009/0259355 A1 * | 10/2009 | Li ..................................... 701/22 |
| 2010/0001672 A1 | 1/2010 | Maeda et al. |
| 2010/0106351 A1 * | 4/2010 | Hanssen et al. ................ 701/22 |
| 2010/0219007 A1 | 9/2010 | Dalum et al. |
| 2010/0274426 A1 | 10/2010 | Le Brusq et al. |
| 2011/0024211 A1 | 2/2011 | Kikuchi |
| 2011/0029173 A1 * | 2/2011 | Hyde et al. ...................... 701/22 |
| 2011/0029181 A1 | 2/2011 | Hyde et al. |
| 2011/0047102 A1 | 2/2011 | Grider et al. |
| 2011/0071712 A1 | 3/2011 | Mizuno et al. |
| 2011/0098873 A1 * | 4/2011 | Koga et al. ...................... 701/22 |
| 2013/0060410 A1 | 3/2013 | Crain et al. |

\* cited by examiner

DYNAMICALLY ASSISTING HYBRID VEHICLES

BACKGROUND

This description relates to techniques for dynamically assisting hybrid vehicles for energy resource management.

With the increased interest to reduce dependency on fossil fuels, the use of alternative energy sources has been incorporated into various applications such as transportation. Both public and private transportation vehicles have been developed to run on a fuel other than traditional petroleum based fuels (i.e., petrol, diesel, etc.). Some vehicles solely use alternative energy sources while others combine the functionality of petroleum based systems with alternative energy based systems (e.g., electrical, biofuel, natural gas, etc.). Along with being potentially more cost-effective and having more abundant resources, such alternative energy sources and their byproducts are considered to be more environmentally friendly.

SUMMARY

The systems and techniques described here relate to dynamically adjusting the ability of an alternative energy based system (e.g., an electric motor) to assist a traditional petroleum based engine (e.g., a combustion engine) for efficient management of an alternative energy source (e.g., one or more batteries) on-board a vehicle. Through these management techniques, efficient use of the alternative energy supply can be achieved without over- or under-utilization, and thereby conserve both the conventional and alternative energy sources.

In one aspect, a computing device-implemented method includes receiving information representative of an amount of energy stored over a first period of time in an energy storage device of a vehicle that includes a first propulsion system. The method also includes receiving information representative of a performance measure of the vehicle for a second period of time, shorter than the first period of time. The method also includes determining an assistance adjustment from an estimated value of stored energy from the information representative of the amount of energy stored over the first period of time in the energy storage device. The method also includes determining a level of assistance for a second propulsion system included in the vehicle from the received information representative of the performance measure, and, adjusting the level of assistance using the assistance adjustment determined from the estimated value of the stored energy.

Implementations may include any or all of the following features. Determining the assistance adjustment from the estimated value of stored energy may be executed internal to the vehicle. Determining the level of assistance for the second propulsion system may be executed internal to the vehicle. The performance measure may represent miles-per-gallon provided by the vehicle. The performance measure may represent instantaneous miles-per-gallon provided by the vehicle. The amount of energy stored over the first period of time in the energy storage device may represent the charge of a battery included in the vehicle. The level of assistance for the second propulsion system may represent a level of assistance for an alternative fuel propulsion system. The level of assistance for the second propulsion system may represent recharging an energy storage device of an alternative fuel propulsion system. The alternative fuel propulsion system may be an electric motor based system. The first propulsion system may include a combustion engine.

In another aspect, a system includes a computing device that includes a memory configured to store instructions. The computing device also includes a processor to execute the instructions to perform operations that include receiving information representative of an amount of energy stored over a first period of time in an energy storage device of a vehicle that includes a first propulsion system. Operations also include receiving information representative of a performance measure of the vehicle for a second period of time, shorter than the first period of time. Operations also include determining an assistance adjustment from an estimated value of stored energy from the information representative of the amount of energy stored over the first period of time in the energy storage device. Operations also include determining a level of assistance for a second propulsion system included in the vehicle from the received information representative of the performance measure, and, adjusting the level of assistance using the assistance adjustment determined from the estimated value of the stored energy.

Implementations may include any or all of the following features. Determining the assistance adjustment from the estimated value of stored energy may be executed internal to the vehicle. Determining the level of assistance for the second propulsion system may be executed internal to the vehicle. The performance measure may represent miles-per-gallon provided by the vehicle. The performance measure may represent instantaneous miles-per-gallon provided by the vehicle. The amount of energy stored over the first period of time in the energy storage device may represent the charge of a battery included in the vehicle. The level of assistance for the second propulsion system may represent a level of assistance for an alternative fuel propulsion system. The level of assistance for the second propulsion system may represent recharging an energy storage device of an alternative fuel propulsion system. The alternative fuel propulsion system may be an electric motor based system. The first propulsion system may include a combustion engine.

In another aspect, one or more computer readable media storing instructions that are executable by a processing device, and upon such execution cause the processing device to perform operations that include receiving information representative of an amount of energy stored over a first period of time in an energy storage device of a vehicle that includes a first propulsion system. Operations also include receiving information representative of a performance measure of the vehicle for a second period of time, shorter than the first period of time. Operations also include determining an assistance adjustment from an estimated value of stored energy from the information representative of the amount of energy stored over the first period of time in the energy storage device. Operations also include determining a level of assistance for a second propulsion system included in the vehicle from the received information representative of the performance measure, and, adjusting the level of assistance using the assistance adjustment determined from the estimated value of the stored energy.

Implementations may include any or all of the following features. Determining the assistance adjustment from the estimated value of stored energy may be executed internal to the vehicle. Determining the level of assistance for the second propulsion system may be executed internal to the vehicle. The performance measure may represent miles-per-gallon provided by the vehicle. The performance measure may represent instantaneous miles-per-gallon provided by the vehicle. The amount of energy stored over the first period of time in the energy storage device may represent the charge of a battery included in the vehicle. The level of assistance for the second propulsion system may represent a level of assistance for an alternative fuel propulsion system. The level of assistance for the second propulsion system may represent recharging an energy storage device of an alternative fuel propulsion system. The alternative fuel propulsion system may be an electric motor based system. The first propulsion system may include a combustion engine.

These and other aspects and features and various combinations of them may be expressed as methods, apparatus, systems, means for performing functions, program products, and in other ways.

Other features and advantages will be apparent from the description and the claims.

DETAILED DESCRIPTION

Figure 1:
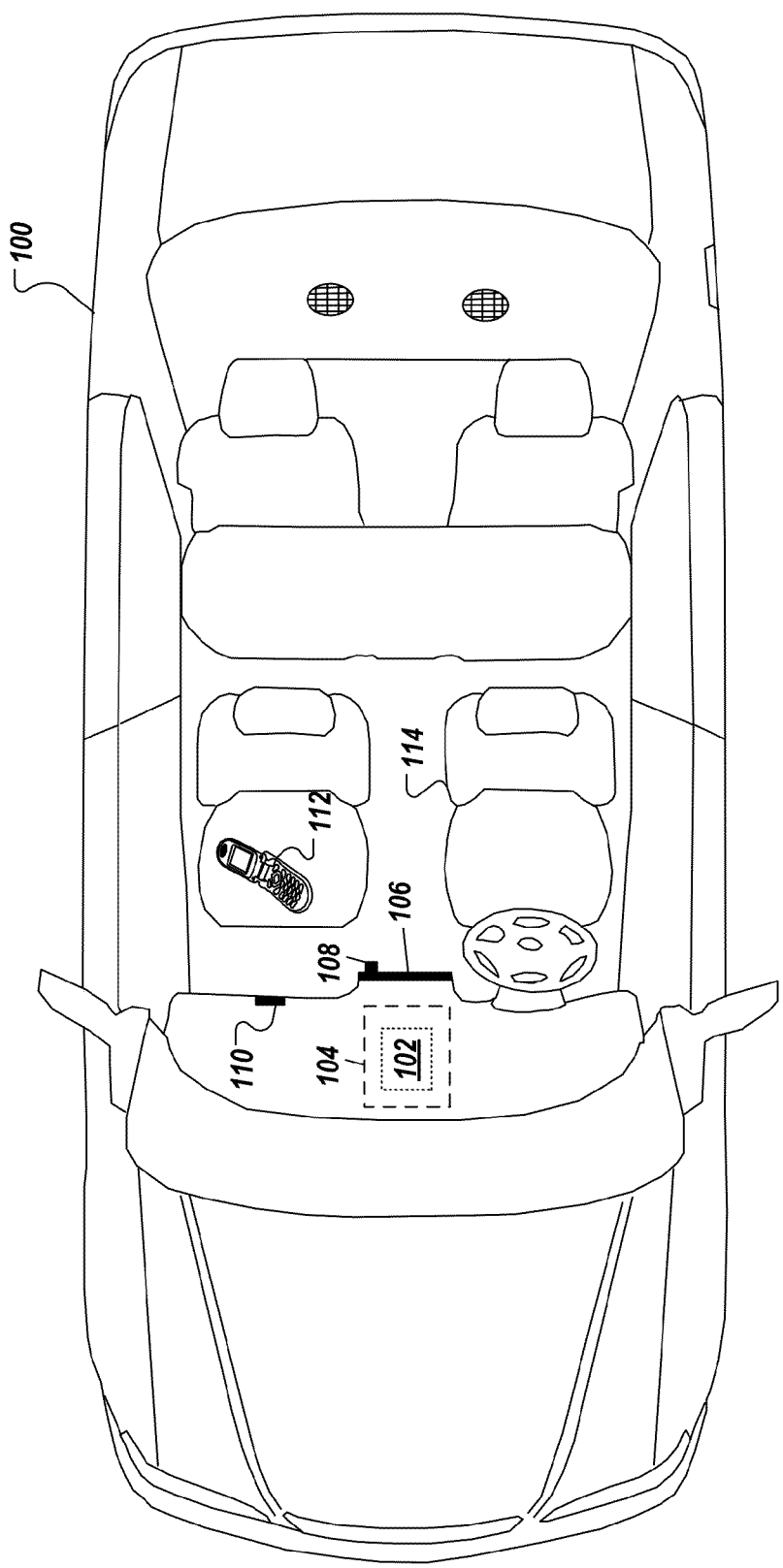
FIG. 1 illustrates a vehicle that includes an assistance manager for its propulsion systems.

Referring to FIG. 1, alternative fuel vehicles may solely rely upon non-petroleum energy sources, such as electricity, natural gas, biofuels etc. Rather than sole reliance on such energy sources, alternative fuel vehicles may also partially rely on an internal combustion engine along with one or more alternative energy sources. For example, a vehicle (referred to as a hybrid vehicle) may use two or more distinct power sources such as an electric motor and an internal combustion engine (referred to as a hybrid electric vehicle (HEV)). Some hybrid vehicles (referred to as plug-in hybrid vehicles) may operate by using energy storage devices that can be replenished (e.g., rechargeable batteries). For electrical energy storage devices, in some arrangements, one or more techniques may be implemented for charging and recharging the devices. For example, batteries may be charged through regenerative braking, strategic charging techniques, etc. during appropriate operating periods of the vehicle. In general, while energy is typically lost as heat in conventional braking systems, a regenerative braking system may recover this energy by using an electric generator to assist braking operations. Some systems and techniques may also strategically collect (e.g., leech) energy from the combustion engine during periods of efficient operation (e.g., coasting, traveling, etc.) and later assist the engine during periods of lesser efficiency. For such vehicles, the electric generator can be a device separate from the electric motor, considered as a second operating mode of the electric motor, or implemented through one or more other techniques, individually or in combination. Energy recovered by regenerative braking may be considered insufficient to provide the power needed by the vehicle. To counteract this lack of energy, the electric motor may be engaged during defined periods to assist the combustion engine and one or more control strategies may be used to determine these time periods. Similarly, periods of time may also be determined to engage regenerative braking and strategic charging to replenish energy storage. Other operations of the vehicle (e.g., accelerate, decelerate, gear changes, etc.) may also be defined for the control strategies. By developing such strategies to control the assistance provided to combustion engines (during low efficiency periods), energy may be conserved without negatively impacting vehicle performance.

Some vehicle manufactures may recommend operations and control strategies for entire classes of vehicles or other types of large vehicle groups (e.g., same model vehicles, same vehicle line, etc.) at particular times (e.g., at the release of the vehicle line). Similarly, the level of assistance provided by an electric motor or other type of alternative fuel system may be a constant. As such these controls are developed for static use and are generally not developed to be dynamically adjusted by the manufacturer or another entity. For example, once the vehicle is purchased, these generic controls are not adjustable.

As illustrated in the figure, a top view of an example vehicle 100 (e.g., a hybrid automobile) is able to dynamically adjust operations to improve operations through efficient use of its alternative fuel based system (e.g., an electric motor). For example, by using one or more performance measures of the vehicle 100, the level of assistance provided by the alternative fuel based system may be dynamically adjusted during operations to improve efficiency, use of energy, fuel sources, etc. To provide this capability, the vehicle includes an assistance manager 102 (here embedded in the dashboard of the vehicle 100) that may be implemented in hardware (e.g., a controller 104), software (e.g., executable instructions residing on a computing device contained in the vehicle), a combination of hardware and software, etc. In some arrangements, the assistance manger 102 may operate in a generally autonomous manner, however, information from one or more users (e.g., identification of the vehicle operators) may be collected for operations of the assistance manager. If such input is needed, a variety of user inputs may be called upon. In this arrangement, the vehicle 100 includes an electronic display 106 that has been incorporated into its dashboard to present information such as selectable entries regarding different topics (e.g., operator ID, planned vehicle operations, trip destination, etc.). Upon selection, representative information may be gathered and provided to the assistance manager 102. In some arrangements, the gathered information may be processed by one or more computing devices (e.g., controllers) before being provided to the assistance manager 102. To interact with the electronic display 106, a knob 108 illustrates a potential control device; however, one or more other types of devices may be used for user interaction (e.g., a touch screen display, etc.). Other types of information may also be gathered; for example, a sensor 110 (here embedded in the dashboard of the vehicle 100) may collect information such as cabin temperature, location of the vehicle (e.g., the sensor being a component of a global positioning system (GPS)) and other types of information. By collecting information such as GPS location information, additional information may be provided to the assistance manager 102 (e.g., location and destination information) for determining the level that the electric motor should assist the combustion engine. In some arrangements information from other vehicles may be used by the assistance manager 102. For example, data may be collected from a fleet of vehicles (e.g., similar or dissimilar to the vehicle 100) and used to determine the assistance levels for the combustion engine of the vehicle (e.g., based on similarly traveled routes). While one sensor 110 is illustrated in this example, multiple sensors may be located internal or external to the vehicle for collecting information (e.g., internal or external temperature, etc.). One or more devices present in the vehicle 100 may also be used for information collection; for example, handheld devices (e.g., a smart phone 112, etc.) may collect and provide information (e.g., location information, identify individuals present in the vehicle such as vehicle operators, etc.) for use by the assistance manager 102 (e.g., identify driving characteristics of a vehicle operator). Similarly, portions of the vehicle itself (e.g., vehicle components) may collect information for the assistance manager 102; for example, one or more of the seats of the vehicle 100 (e.g., driver seat 114) may collect information (e.g., position of the seat to estimate the driver's weight) for being provided to the assistance manager 102.

To make determinations about the amount of assistance to be provided to the combustion engine of the vehicle, operational information may also be collected. For example, one or more performance measures such as instantaneous miles-per-gallon (instantaneous MPG), fuel consumption rate (e.g., gallons per hour), current speed, acceleration, accelerator pedal position, etc. may be collected. Information regarding the alternative fuel based system may also be collected. For example, the current state of the alternative fuel source such as a measure of the amount of energy stored in one or more storage devices residing on the vehicle. In one arrangement the state of charge of one or more batteries onboard the vehicle 100 may be provided to the assistance manager 102. Based upon the type of alternative fuel being used by the vehicle, other measures may be provided; for example, chemical levels, natural gas levels, biofuel levels, etc. may be used by the assistance manager 102.

Along with determining the amount of assistance to be provided, the assistance manager 102 may also take part in providing an interface to components of the vehicle 100. For example, upon the level of assistance is quantified, the assistance manager 102 may also function as an interface with components of the vehicle 100. For example, one or more quantities associated with a determined level of assistance (e.g., a request that includes the level of assistance) may be provided to appropriate components of the vehicle (e.g., interface modules, circuitry, etc. for controlling the operations of the combustion engine, the electrical motor, etc.).

In some arrangements, remotely located information sources may be accessed by the vehicle. Similarly, some or all of the functionality of the assistance manager 102 may be provided from a remote location. While illustrated in the figure as residing onboard the vehicle 100, in some arrangements, the assistance manager 102 or a portion of the assistance manager may be located and executed at one or more other locations. In such situations, one or more communication techniques and methodologies may be implemented for the vehicle 100 to be provided assistance from a remotely located assistance manger. For example, one or more wireless communication techniques (e.g., radio frequency, infrared, etc.) may be utilized that call upon one or more protocols and/or standards (e.g., the IEEE 802.11 family of standards such as Wi-Fi, the International Mobile Telecommunications-2000 (IMT-2000) specifications such as 3rd generation mobile telecommunications (3G), 4th generation cellular wireless standards (4G), wireless technology standards for exchanging data over relatively short distances such as Bluetooth, etc.).

Figure 2:
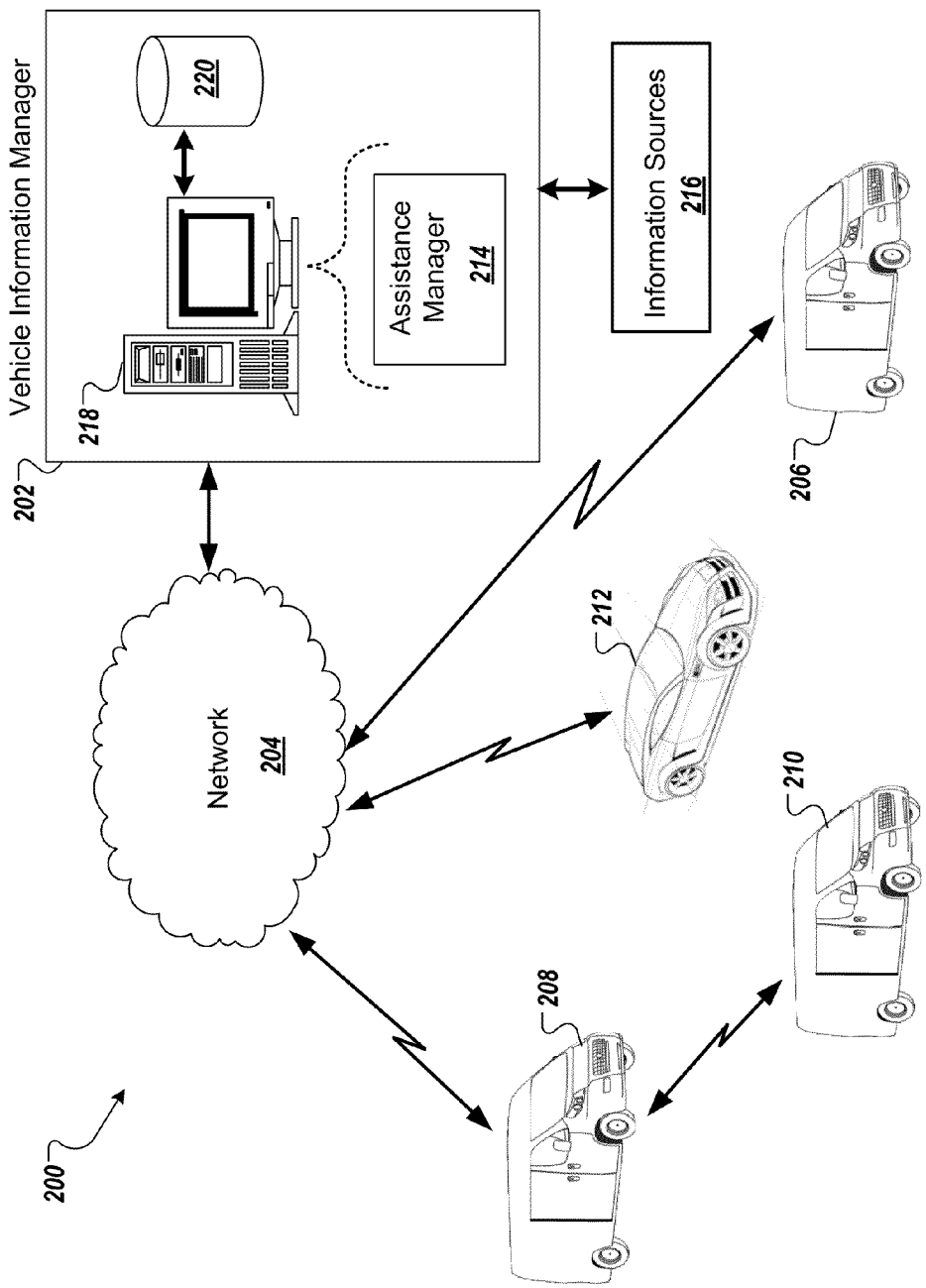
FIG. 2 illustrates a network-based assistance manager for managing propulsion systems of multiple vehicles.

Referring to FIG. 2, an information exchanging environment 200 is presented that allows information to be provided from a central location for assisting alternative fuel vehicles such as hybrid vehicles. In some arrangements, the information is collected from vehicles or other information sources for determining the level of assistance to provide, for example, to vehicle 100 (shown in FIG. 1). One or more techniques and methodologies may be implemented for providing such information to the vehicles. For example, one or more communication techniques and network architectures may be used for exchanging information. In the illustrated example a vehicle information manager 202 communicates through a network 204 (e.g., the Internet, an intranet, a combination of networks, etc.) to exchange information with a collection of vehicles (e.g., a small fleet of supply trucks 206, 208, 210, and an automobile 212). In some arrangements the network architecture 204 may be considered as including one or more of the vehicles. For example, vehicles may include equipment for providing one or more network nodes (e.g., supply truck 208 functions as a node for exchanging information between the supply truck 210 and the network 204). As such, the information exchanging capability may include the vehicles exchanging information with the vehicle information manager 202 and other potential network components (e.g., other vehicles, etc.).

One or more technologies may be used for exchanging information among the vehicle information manager 202, the network 204 (or networks) and the collection of vehicles. For example, wireless technology (capable of two-way communication) may be incorporated into the vehicles for exchanging information with the vehicle information manager 202. Along with providing and collecting information from the vehicles, the vehicle information manger 202 may be capable of processing information (e.g., in concert with an assistance manger 214 to determine assistance levels) and executing related operations (e.g., store collected and processed information). In some arrangements, the vehicle information manager 202 may operate as a single entity; however, operations may be distributed among various entities to provide the functionality. In some arrangements, some functionality (e.g., operations of the assistance manger 214) may be considered a service, rather than a product, and may be attained by entering into a relationship with the vehicle information manager 202 (e.g., purchase a subscription, enter into a contractual agreement, etc.). As such, the vehicle information manager 202 may be considered as being implemented as a cloud computing architecture in which its functionality is perceived by clients (e.g., vehicle operators) as a service rather than a product. For such arrangements, vehicles may be provided information (e.g., quantities that represent levels that an electric motor should assist a corresponding combustion engine) from one or more shared resources (e.g., hardware, software, etc.) used by the vehicle information manager 202. For service compensation, one or more techniques may be utilized; for example, subscription plans for various time periods may be implemented (e.g., a monthly subscription fee for assistance levels and operating recommendations should be provided to identified vehicles).

Similar to an onboard assistance manger (e.g., the assistance manager 102 of FIG. 1), an off-vehicle assistance manager (e.g., the assistance manager 214) may use one or more quantities from a vehicle (e.g., stored energy measure such as battery charge level, a performance measure such as instantaneous MPG, etc.) to determine the level of assistance for fuel management. In some arrangements, quantities may also be based upon vehicle components and component operation (e.g., transmission shift points based upon engine revolutions per minute (rpm), load effects, engine torque output based on position of an accelerator pedal, etc.). In some arrangements, user-associated information (e.g., historical driving characteristics of an operator) may be for defining assistance levels (e.g., an initial level of assistance) for use by the assistance manager 214.

One or more types of assistance, levels of assistance, etc. may be defined for use by the assistance manager 214 (or the onboard assistance manager 102). In some arrangements the level of assistance may be defined as a percentage that represents the amount an alternative fuel system (e.g., an electric motor) should assist a corresponding combustion engine of a vehicle (e.g., 100% to fully assist the combustion engine, 0% to provide no assistance to the combustion engine, etc.). To determine such an assistance percentage, one or more quantities originating with the vehicle may be used by the assistance manager (e.g., the onboard assistance manager 102, the offboard assistance manager 214). For example, a measure of available energy may reflect the alternative fuel system's ability to assist. For an electric motor based alternative fuel system, the charge state of the battery (or batteries) onboard the vehicle may provide such a measure. Information from the combustion engine of the vehicle may also be used to determine the assistance percentage. For example, a performance measure of the combustion engine such as the instantaneous MPG of the vehicle may be utilized. Such a performance measure may be provided by other quantities, for example, vehicle speed, the position of one or more of the vehicle's pedals (e.g., the accelerator pedal position, brake pedal position, etc.), data that represents collecting energy (e.g., regenerative braking, strategic charging, leeching, etc.) to replenish energy storage (e.g., charging, recharging vehicle batteries, etc.). In one arrangement, by monitoring the capability of the alternative fuel system (e.g., the current charge state of the battery or batteries), a target performance measure (e.g., a target MPG) may be defined and dynamically adjusted to determine the amount of assistance needed. For example, if the charge state of the battery (or batteries) of the vehicle is above a predefined value (e.g., 50% charged), additional assistance may be provided by the electric motor due to this excess charge. To use this additional assistance, a target performance measure (e.g., the target MPG) could be increased thereby causing a need for an increased level of assistance from the electric motor. For the alternative situation, if the charge state of the vehicle battery (or batteries) is below the predefined value, the target performance measure (e.g., target MPG) may be lowered so less assistance is needed from the electric motor. By lowering the assistance level, the onboard battery or batteries are less likely to drain and recharging (e.g., through regenerative braking) may be triggered to replenish the energy supply. One or more techniques may be implemented for monitoring the charge state of the battery (or batteries) for determining how to adjust the performance measure. For example, the performance measure may be dynamically adjusted for each instance that the charge state is measured. An adjustment may also correspond to a series of charge state measurements. For example, measured charge state may be averaged over a period of time (e.g., a minute, an hour, etc.) and a target performance measure may be adjusted each time period. As such, the performance measure may be dynamically adjusted in a comparatively slow manner. Through these dynamic adjustments to the performance measure (e.g., the target MPG), the charge state of the battery (or batteries) may balance out at the predefined value (e.g., 50% charge) so as not to under or over utilize the energy source.

Along with information being provided by one or more vehicles (e.g., received onboard, received through the network 204, etc.), the vehicle information manager 202 may utilize data from other sources to improve alternative fuel use, identify fuel-saving opportunities, etc. For example, information sources 216 external to the vehicle information manager 202 may provide vehicle related information (e.g., manufacture recommendations for battery charge state, vehicle load conditions, etc.), environmental information (e.g., current road conditions where the vehicle is operating, traffic conditions, topographical information, weather conditions and forecasts, etc.). In some arrangements, the information sources 216 may be in direct communication with the vehicle information manager 202; however, other communication techniques may also be implemented (e.g., information from the information sources 216 may be provided through one or more networks such as network 204).

To select and define the quantities such as the alternative fuel capacity of the vehicle (e.g., battery charge state) and performance measure (e.g., instantaneous MPG) for attempting to balance the use of the alternative fuel, one or more types of information may be utilized. For example, various types of information may be used to define an appropriate charge state (e.g., 50% charge), an initial performance measure for the vehicle (e.g., 14 MPG), etc. may be determined from a variety of information sources. For example, historical information regarding operations of the vehicle (e.g., typical MPG provided by the vehicle during operation), the vehicle operator (e.g., average driving speed of the operator), etc. may factor into quantity selection. Sensor information (e.g., from embedded vehicle sensors, sensing device present in the vehicle, etc.) may also provide information such as vehicle weight, road grade, temperature, etc. that is used to analyze the vehicle's activity and develop the quantities. Vehicles such as delivery vans may frequently be driven in similar manners (e.g., similar driving pattern, operating hours, routes, mileage, cargo being hauled, mannerisms of the drivers, etc.) that may also be represented in the analysis. From relative current information (e.g., data provided near real time) and previously collected information (e.g., historical data for a vehicle, a fleet of similar vehicles, etc.), the assistance manager 214 may analyze and produce the quantities for determining assistance levels needed for a combustion engine. For example, quantities may be determined for an individual vehicle that accounts for data associated with the vehicle and information that accounts for historical patterns of similar vehicles, vehicles operating under similar conditions, etc. Since a fleet of similar vehicles would typically produce larger amounts of information, compared to information generated by a single vehicle, quantities for assistance strategies based upon multiple vehicles (e.g., vehicles operating under similar environmental conditions, vehicles operating in the same general geographical area, the entire vehicle fleet, etc.) may provide more appropriate quantities for determining assistance levels for efficient use of both the alternative fuel system and the combustion engine, for example.

Along with developing quantities based on the operations of one or more vehicles, quantities associated with determining assistance levels may also address other activities related to vehicle operation. For example, some alternative fuel vehicles such as plug-in hybrid electric vehicles (PHEV) allow their batteries to be charged by regenerative braking but also allow the batteries to be recharged from an electric energy source (e.g., the batteries are plugged into the electric grid to be charged or recharged). Information reflective of charging such batteries may be incorporated into determining the quantities (e.g., predefined charge value of 50%) used by the assistance manager 214 (or the assistance manager 102). For example, by analyzing the location of potential charging stations, historical availability of the charging stations, current and projected electricity cost, electricity load/demand information, information associated with the electricity grid and/or utility providers (e.g., economic and historical data), etc. may be used for developing appropriate vehicle assistance strategies.

In the illustrated example, to provide such functionality, the vehicle information manager 202 includes a server 218 that is capable of being provided information from the network 204 and the information sources 216. Additionally, the server 218 is illustrated as being in direct communication with a storage device 220 that is located at the vehicle information manager 202. In this example of the assistance manager 214 being off board a vehicle, in comparison to the assistance manager 102 (of FIG. 1), the assistance manager 214 is executed by the server 218. Provided information from one or more of the sources, quantities and assistance levels may be developed by the assistance manager 214. Along with determining appropriate assistance levels for balancing the use of the alternative fuel (e.g., battery charge state), functionality of the assistance manager 214 may appropriately manage the distribution of the determined quantities and assistance levels for delivery to one or more corresponding vehicles. For example, one or more database systems, data management architectures, communication schemes may be utilized by the assistance manager 214 for information distribution. In some arrangements, such distribution functionality may be provided partially or fully by the assistance manger 214 or external to the assistance manager. In some arrangements this distribution functionality may be provided by other portions of the vehicle information manager 202 or provided by another entity separate from the information manager for distributing assistance levels and/or other types of information. Further, while a single server (e.g., server 218) is implemented in this arrangement to provide the functionality for the vehicle information manager 202, additional servers or other types of computing devices may be used to provide the functionality. For example, operations of the assistance manager 214 may be distributed among multiple computing devices located at one or more locations.

Upon one or more quantities and assistance levels being produced, one or more operations may be executed to provide appropriate information to one or more vehicles. For example, operations of a computing device (e.g., the server 218) located at the vehicle information manager 202 may provide the information to the appropriate vehicle (or vehicles). By using one or more wireless links the information may be delivered (e.g., through the network 204). In some arrangements one or more trigger events may initiate the information being sent to a vehicle. For example, upon one or more messages, signals, etc. being received at the vehicle information manager 202 (e.g., that an identified operator has begun driving a particular hybrid vehicle), data representing the appropriate assistance strategy (e.g., a charge state goal such as 50%, initial instantaneous MGP target, initial level for the electric motor to assist the combustion engine, leeching amount, etc.) may be provided to the vehicle. For arrangements in which the analysis is executed onboard the vehicle, quantities associated with an assistance strategy may be identified onboard (e.g., by the assistance manager 102) and provided to appropriate components of the vehicle. In still other arrangements, one or more strategies could be manually loaded onto a vehicle—for example a vehicle could be preloaded with an assistance strategy specific to typical routes, have multiple driver-selectable strategies loaded, etc. Along with providing strategies, updated data may similarly be sent to vehicles to make needed adjustments to previously provided strategies (e.g., adjust initial quantities, update assistance levels, etc.). Adjustments to provided strategies may also be adjusted after delivery to the vehicle. For example, one or more components included in the vehicles may monitor the strategies (e.g., using artificial intelligence algorithms, neural networks, etc.) and make appropriate adjustments (e.g., goal charge state, assistance levels) for an electric motor, etc. of the vehicle.

Figure 3:
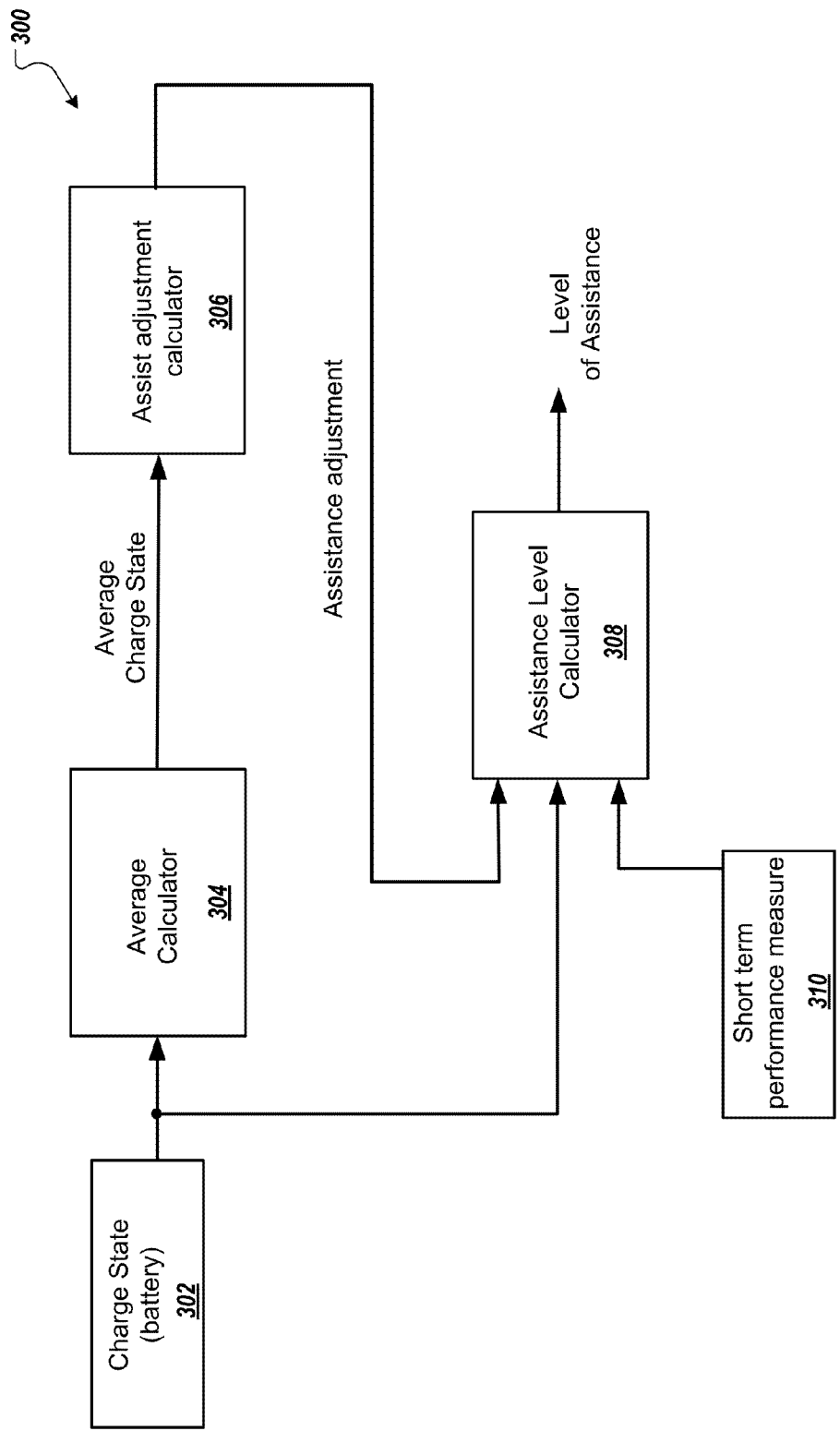
FIG. 3 illustrates a diagram of an assistance manager.

Referring to FIG. 3, a system level diagram 300 presents one processing arrangement for attempting to substantially maintain an appropriate charge state for an electric motor based system by determining and adjusting the level of assistance to provide to a vehicle's combustion engine. In general, the diagram 300 presents operational functions of an assistance manager (e.g., the onboard assistance manager 102, the off board assistance manager 214, etc.). In this example, the charge state of one or more batteries on the vehicle is used to determine if the level of assistance based on a performance measure (e.g., instantaneous MPG) needs to be adjusted. In general, if the charge state has a reasonable (e.g., predefined) value, little or no adjustments may be needed. Alternatively, if the charge state is above or below this reasonable value (or outside a reasonable charge state range), the level of assistance determined from the performance measure may be adjusted (e.g., to return the charge state to the reasonable value, range of reasonable values, etc.). For example, if excess charge is present, the level of assistance may be increased (e.g., to increase the MPG of the vehicle) to use the excess charge. Alternatively, if less charge is present, the level of assistance may be decreased to all the battery or batteries of the vehicle to be replenished. While one particular quantity (e.g., charge state) is used as a measure of available alternative fuel in this arrangement, one or more other quantities may be used in concert with or to replace this quantity. Similarly, while instantaneous MPG is used as a performance measure, one or more other types of performance measures may be utilized. For example vehicle speed, accelerator pedal position, etc. may be used for performance measures. Further, different types of assistance may be provided (compared to the level of assistance that an electric motor provides to a combustion engine). For example, the amount of energy collected (e.g., leeching) from the combustion engine may be determined.

In general, to efficiently use the energy stored in the battery (or batteries), a target charge state may be set to define the amount of charge that should remain available in the battery (or batteries). For example, a target charge state of approximately 50% may be defined such that use of the battery may be considered inefficient when the charge state exceeds this target value (e.g., the battery is recharging faster than energy is delivered to assist the combustion engine). Generally, the electric motor is capable of assisting the combustion engine more when there is a charge surplus. For time periods when the charge state is below the target charge state (e.g., the charge state of the battery is 40% while the target charge state is 50%), the battery may be considered as being drained faster than recharging can occur. As such, the electric motor is assisting the combustion engine by an amount that may unsustainable. By dynamically adjusting the amount of assistance being provided by the electric motor, the charge present on the battery may be closely held to the target charge state (e.g., approximately 50%) as the vehicle is being operated.

As illustrated in the figure, a charge state 302 of one or more batteries included in the vehicle is provided for processing. One or more sensors located onboard the vehicle (or by implementing another data collection technique) provide data representative of the charge state 302. In some implementations, the charge state 302 may be sampled at a relatively fast rate (e.g., sampled at intervals of ten, twenty millisecond, etc.) and provided in a time series of data points. While such data can provide a clear measure of the current charge state, adjusting the level of assistance provided to the combustion engine for such short time intervals may be excessive and impractical. For example, adjustments to the level of assistance provided by the electric motor may account for slower paced factors such as the driving habits of a particular operator, the route the vehicle is being driven, etc. As such, the charge state of the battery over a longer period of time (compared to the ten, twenty millisecond interval that the charge samples are provided) may be advantageous. One or more techniques may be used to represent the charge state 302 over a longer period of time. For example, the time series that represents the charge state 302 may be averaged over a period of time. In this arrangement, an average calculator 304 receives and processes the data representing the charge state 302. An estimated value (e.g., mean) of the time series may be computed by the average calculator 304 for a particular interval in time (e.g., five minutes, etc.) that is considerably longer than the sampling interval of the charge state. Similar to calculating the estimated value (also referred to as average value), other types of statistical operations may be executed by the average calculator 304 to represent the charge state over a period of time (e.g., calculate median, mode, etc.). Some implementations may also discharge collected data, estimated values, etc. after a period of time (e.g., to conserve memory on the controller 104). For example, after residing in memory for a predefined period, e.g., one hour, the collected data and corresponding calculated estimated values (e.g., for five minute interval) later than an hour may be discarded.

Upon calculating the average state of charge of the vehicle's battery (or batteries), the assistance manager compares the charge state average (e.g., the long term average of the charge state) to the desired charge state (e.g., 50%) for efficient use of the stored charge. In this particular arrangement, the average calculator 304 provides the charge state average to an assist adjustment calculator 306. In general, the assist adjustment calculator 306 determines an amount that represents the adjustment to the level of assistance (e.g., that the electric motor should provide to the combustion engine. To provide this functionality, one or more techniques may be implemented. In some arrangements, other quantities may also be provided to the assist adjustment calculator 306. For example, the desired charge state (e.g., 50%) may be provided along with the average charge state. Various techniques may be implemented for providing such quantities, for example, one or more look-up tables or other techniques may be employed.

To determine a measure of the assistance adjustment, the assist adjustment calculator 306 may implement one or more techniques. For example, based upon a comparison with the desired charge state (e.g., a 50% charge state), the assist adjustment calculator 306 may use the average charge state to define an assistance adjustment. For situations in which the received average charge state is above the desired state, the assistance adjustment may be increased. For example, if the average charge state is above a 50% desired charge state, a value representing the assistance adjustment may be increased by an amount (e.g., 0.01%) to increase the level of assistance and corresponding a target performance measure (e.g., increase the MPG of the vehicle). As such, since the long term average of the vehicle's battery is above the desired charge threshold, the MPG performance measure can be increased for using the excess energy stored in the battery. Alternatively, if the average batter charge is below the desired charge state (e.g., of 50%), the assistance adjustment can be decreased (e.g., by 0.01%) to decrease the level of assistance and the target performance measure, for example, to reduce the draining of the vehicle battery. In some arrangements, the amount (e.g., 0.01%) used to increase or decrease the assistance adjustment may be equivalent; however, in other the amounts may be different for some situations. Also, different quantities may be adjusted, for example, rather than a dimensionless quantity, quantities with other dimensions (MPG) may be adjusted in determining the amount of needed assistance. In some situations, the average calculator 304, the assist adjustment calculator 306, etc. may not data (e.g., charge state) from certain time periods, for example, when the vehicle is stopped, driving at high speed (e.g., because the electric motor may not active during these periods), when one or more anomalies are detected in the charge state, etc.

Once determined, the assist adjustment calculator 306 provides the assistance adjustment to an assistance level calculator 308 for further processing. In this arrangement, the assistance level calculator 308 uses the assistance adjustment with a performance measure from the vehicle to determine a level of assistance. As such, a slowly changing assistance adjustment target (e.g., determined from the average charge state over a relatively long time period) is used with a current sample of the performance measure (e.g., the instantaneous MPG) collected from the vehicle (e.g., in operation).

In this arrangement, the assistance level calculator 308 also receives the charge state 302 from the vehicle (e.g., the time series that represents the charge state of the vehicle's battery, another representation of the charge state that is different from the representation provided to the average calculator 304). Although an average charge state has been used to produce assistance adjustment, the assistance level calculator 308 may check the charge state 302 for anomalies that could potentially override (or complement) adjustments caused by the average charge state. For example, the assistance level calculator 308 may use the assistance adjustment as provided (by the assist adjustment calculator 306) so long as the charge state 302 does not broach a particular range (e.g., the charge state remains between 40% and 60%). If however the charge state 302 falls outside this range, the assistance adjustment may be changed for handling such excessively small or large charge states. For example, if the charge state 302 drops below 40%, the assistance level calculator 308 may lower the value of the assistance adjustment so less assistance is provided to the combustion engine and the battery is provided recovery time. Alternatively, if the charge state 302 reports a charge increase to a level above 60%, the assistance level calculator 308 may increase the value of the assistance adjustment so more assistance is provided to the combustion energy and the amount of energy stored on the battery (or batteries) correspondingly reduces.

The assistance level calculator 308 also determines the amount of assistance to be provided to the combustion engine. In this arrangement, the assistance level calculator 308 uses the assistance adjustment and a relatively short term performance measure 310 from the vehicle (e.g., vehicle instantaneous MPG). Provided from the vehicle (e.g., while being operated), the short term performance measure may take one or more forms such as a time series of data in which the performance measure (e.g., vehicle instantaneous MPG) is sampled at a relatively short time interval (e.g., 10 or 20 millisecond) over a period of time, in a continuous stream, etc.

In general, by using the assistance adjustment (adjusted for the average charge state and accounting for any detected charge abnormalities) and the short term performance measure (e.g., the instantaneous MPG) provided by the vehicle, the assistance level calculator 308 may implement one or more techniques and methodologies to determine the level of assistance that the vehicle's electric motor should provide to the vehicle's combustion engine. In this arrangement, an initial level of assistance is determined from the instantaneous performance measure (e.g., instantaneous MPG) from the vehicle and the level is changed (if needed) based upon the assistance adjustment (provided by the assist adjustment calculator 306). If adjustment is not needed, the level of assistance determined from the short term performance measure (e.g. instantaneous MPG) is used for assisting the combustion engine.

One or more techniques and methodologies may be utilized by the assistance level calculator 308, for example, to determine the level of assistance that the electric motor should provide to the combustion engine of the vehicle. For example, using the provided quantities, an assistance level may be determined by using one or more mathematical functions (e.g., one or more linear functions that map the short term performance measure 310 to an assistance level), using one or more look-up tables (e.g., to determine an assistance level from the performance measure), utilizing other types of numerical relationships, etc. In some arrangements, the level of assistance may be defined as a percentage that the electric motor is to assist the combustion engine. However, other quantities, scaling schemes, etc. may be used for defining the level of assistance based upon the performance measure. Once determined, the level of assistance may be provided to one or more portions of the alternative fuel system for use. For example, the assistance level may be encoded into one or more signals for sending to a controller of the electric motor or other system components. Along with providing the assistance level to adjust the operations of the electric motor, the quantity can also be used for further processing and other operations. For example, one or more feedback schemes may be implemented such that the assistance level is used for determining future assistance levels or other quantities to improve use of the alternative fuel system and efficiency of operations of the vehicle.

Figure 4:
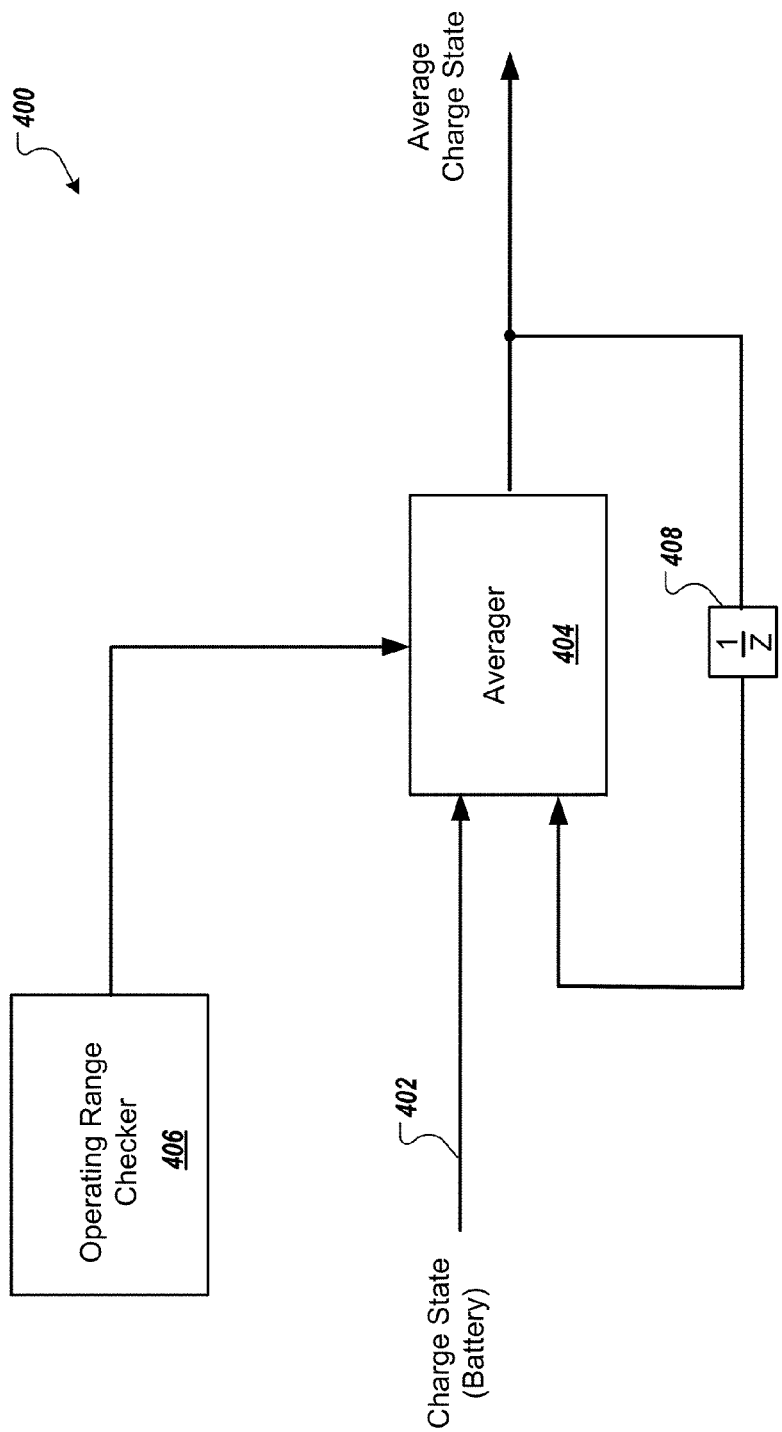
FIG. 4 illustrates a diagram of an average calculator.

Referring to FIG. 4, one or more type of arrangements and architectures may be implemented to provide the functionality of the assistance manager (e.g., the onboard assistance manager 102, the off board assistance manager 212, etc.). For example, as illustrated in the figure, a diagram 400 presents one graphical representation for implementing the functionality of a portion of the average calculator 304 (shown in FIG. 3). In this implementation, the charge state of the vehicle's battery (or batteries) is provided to an input 402 of an averager 404. An operating range checker 406 provides, in this example, one or more control signals (e.g., a logic level) that indicates whether or not the average should execute. For example, the operating range checker 406 may monitor samples of the charge state (e.g., a time series) and determine if the samples are within an appropriate range (e.g., between charge states of 40% and 60%). The checker 406 may also determine if the vehicle is in a proper operating mode (e.g., not stopped, not traveling at a high speed, etc.), if one or more system faults have occurred (e.g., the vehicle is not operating properly), etc. for assistance to be provided. To calculate the average, a time-delayed version of the output of the averager 404 is also provided as an input (as represented by the time delay function 408). Along with using one or more techniques to calculate the average, various techniques may be implemented for performing operations on the battery charge state input 402 and the delayed version of the averager 404 output (e.g., queuing techniques, storage memory, etc.). Also, the averager 404 may use one or more techniques to determine the average value or others types of quantities of input (e.g., estimated value, median value, mode, etc.).

Figure 5:
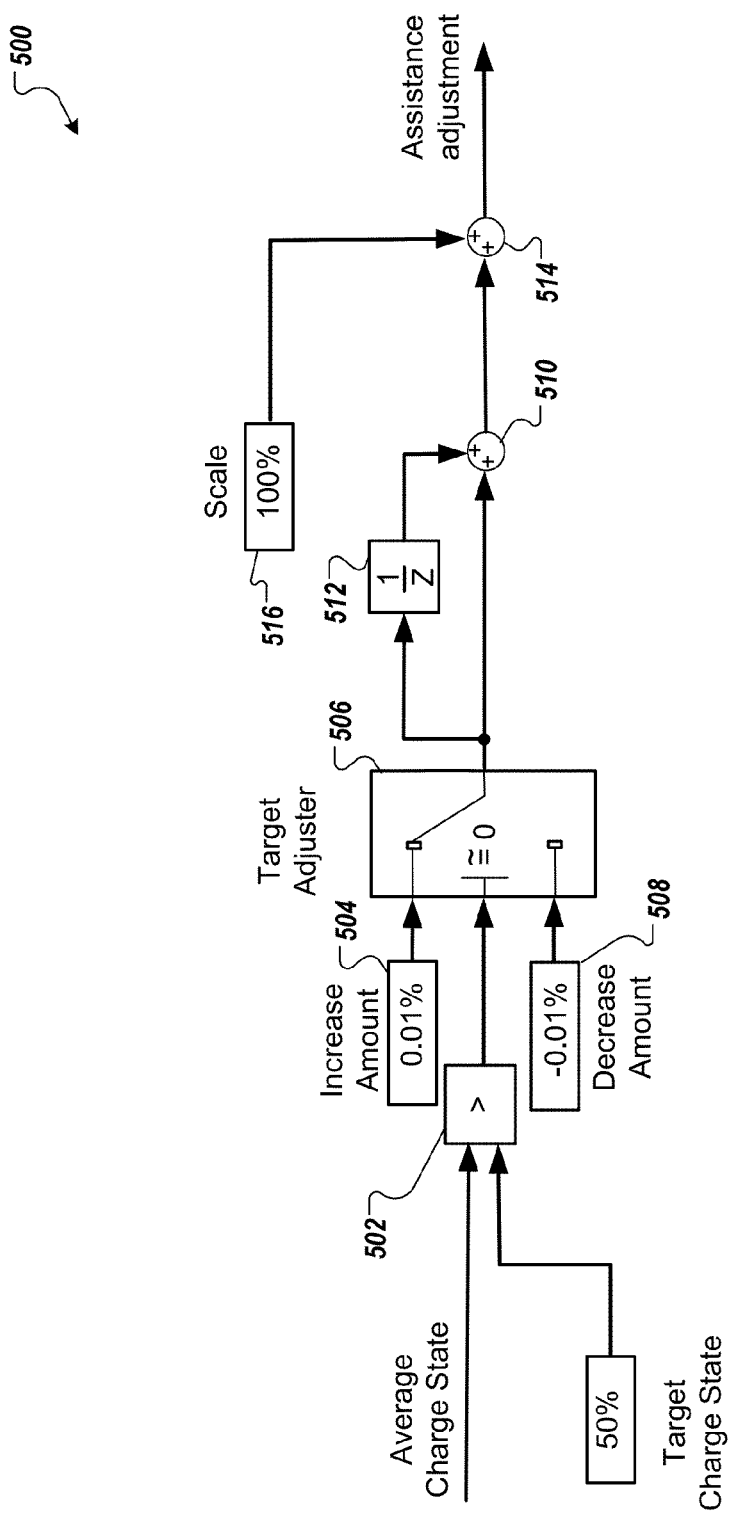
FIG. 5 illustrates a diagram of an assist adjustment calculator.

Referring to FIG. 5, another portion of an assistance manager is presented that uses graphics for representing functionality, data flows, etc. The figure represents an implementation of an assist adjustment calculator such as the assist adjustment calculator 306 (shown in FIG. 3). Provided the average charge state (e.g., from the average calculator 304), a comparer 502 determines if the average is greater, less, or equivalent to a target charge state (e.g., 50% charge state of the battery or batteries). Based on the comparison, a numerical value is determined for determining a level of assistance. For example, if average charge state is greater than the target charge state, an increment amount 504 (e.g., 0.01%) is received by a target adjuster 506. Similarly, if the average charge state is less than the target charge state a decrement amount 508 (e.g., −0.01%) is received by the target adjuster 506, or, if the compared values are approximately equivalent, a value of zero is received by the target adjuster 506. Once the adjustment amount (or none) due to the comparison is determined, the quantity is provided to a summer 510 and is combined with one or more previous adjustment amounts (as provided by a delay function 512). Through this combination, the summer 510 provides a running sum of the slowly adjusted amounts for the average charge states received from the average calculator 304. Being combined with previous amounts versions, the value of an assistance adjustment can be considered as being slowly adjusted. Once combined, the amount is provided to another summer 514 and added to a scalar amount 516 (e.g., 100%) to produce an output ready for additional processing such as being used to determine a level of assistance (e.g., for an electric motor to assist a combustion engine of a vehicle).

Figure 6:
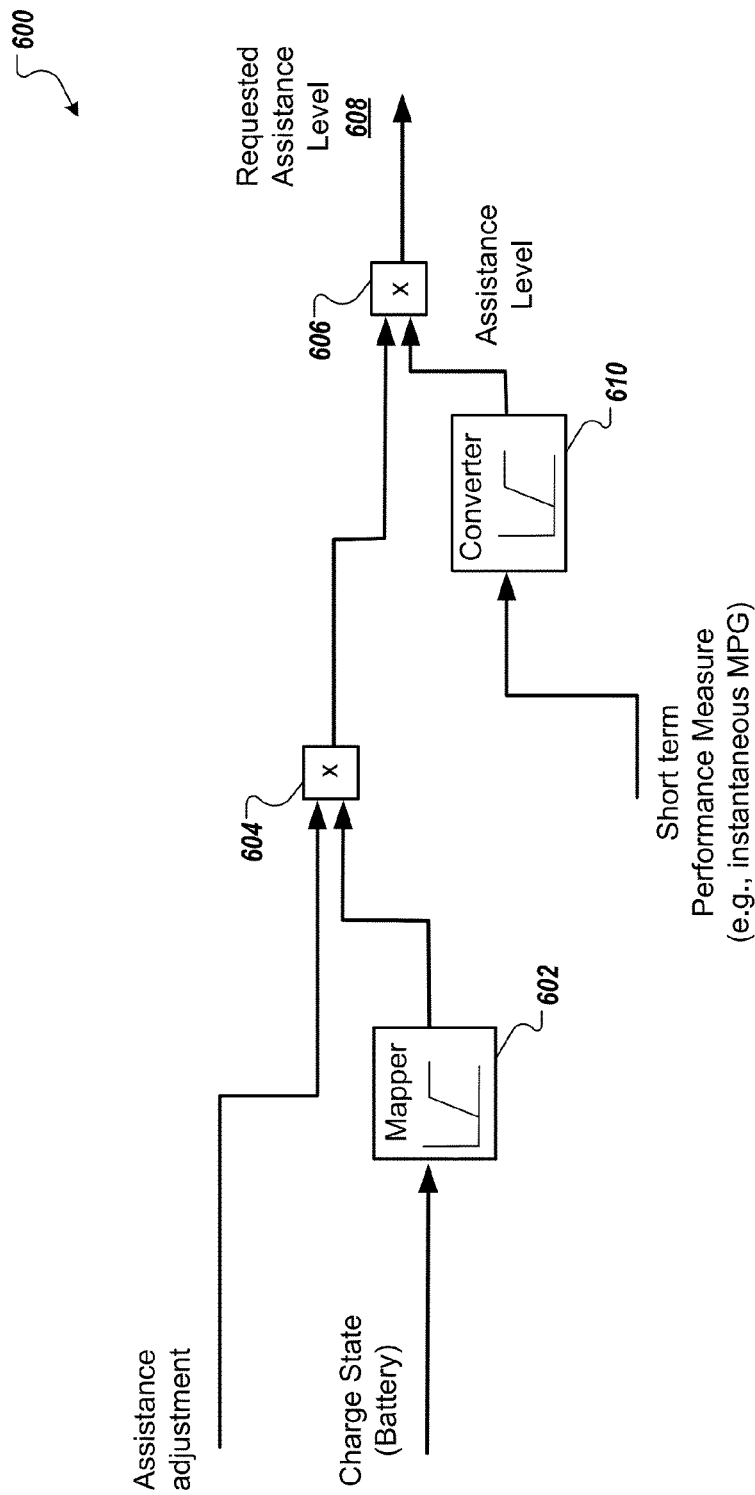
FIG. 6 illustrates a diagram of an assistance level calculator.

Referring to FIG. 6, the functionality of one arrangement of an assistance level calculator (e.g., the assistance level calculator 308 shown in FIG. 3) is provided by a diagram 600. Along with being provided the assistance adjustment output of the assist adjustment calculator 306, the assist level calculator is also provided the charge state of the battery or batteries of the vehicle (e.g., a time series that represents the charge state). The charge state is provided to a mapper 602 to determine if the charge state is approximately within an appropriate range of operation (e.g., between 40% and 60% charge state). If the charge state is outside this range, the mapper 602 produces data for addressing such excessively large or small charge state. For example, if within the appropriate operating range (e.g., between 40% and 60%), a unity value may be provided to a multiplier 604 for multiplying to the assistance adjustment. In effect, the assistance adjustment (from the assist adjustment calculator 306) remains unchanged when multiplied by the unity value. For situations when the charge state is outside the range of operation, a non-unity value may be provided from the mapper 602 to the multiplier 604. For example, a value less than unity (e.g., 0.9) may be provided to the multiplier 604 if the charge state is below the operating range (e.g., for charge states under 40%). For charge states above the operating range (e.g., above 60%), a value greater than unity (e.g., 1.1) may be provided by the mapper 602. Once calculated, the output of the multiplier 604 is provided to another multiplier 606 to adjust a level of assistance (e.g., for the electric motor to assist the combustion engine) determined from a performance measure (e.g., of the vehicle).

In general, one or more performance measures (e.g., instantaneous MPG), which is provided by the vehicle, is used to determine a level of assistance. Once determined, the level of assistance is adjusted by the output of the multiplier 606 (based upon the assistance adjustment due to the charge state) prior to being sent as a requested assistance level 608. Various techniques may be implemented for sending the requested assistance level, for example, one or more signals (e.g., control signals), messages, etc. may be used by the assistance level calculator 308 (or one or more other portions of the assistance manager 102, for example) to represent the quantity of the requested assistance level (e.g., an assistance percentage).

One more techniques may be implemented for determining a level of assistance from a vehicle's performance measure. For example, data that represents the performance measure (e.g., instantaneous MPG) may be provided to a converter 610 that converts the value of the performance measure into an assistance level (e.g., a percentage). One or more look-up tables, mathematical functions, relational databases, etc. may be used for determining the assistance level from the performance measure value. Also, while one performance measure (e.g., instantaneous MPG) is used in this example, multiple performance measures may be used for determining an assistance level. In such arrangements, multi-dimensional processing (e.g., using a multi-dimensional look-up table) may be used for identifying an assistance level. For the illustrated example that uses one performance measure, a particular measure value (e.g., 14 MPG) is provided to the converter 610 and a corresponding assistance level (e.g., 50%) is determined. By providing the assistance level (e.g., 50%) to the multiplier 606, the assistance level may be adjusted to account for the relatively long term charge state (e.g., the average charge state) of the battery or batteries of the vehicle. For example, if an assistance adjustment of 110% is provided to the multiplier 606 (from the multiplier 604) along with an assistance level of 50% (from the converter 610), the output of the multiplier 606 provides a requested assistance level of 55%. As such, based upon the relatively long term charge state of the battery (or batteries) being above the target value (of 50% as shown in FIG. 5), the assistance level is increased from 50% to 55% to account for the additional charge that can be used by the electric motor to assist the combustion engine and thereby improve efficiency of the use of the vehicle's alternative fuel system.

Figure 7:
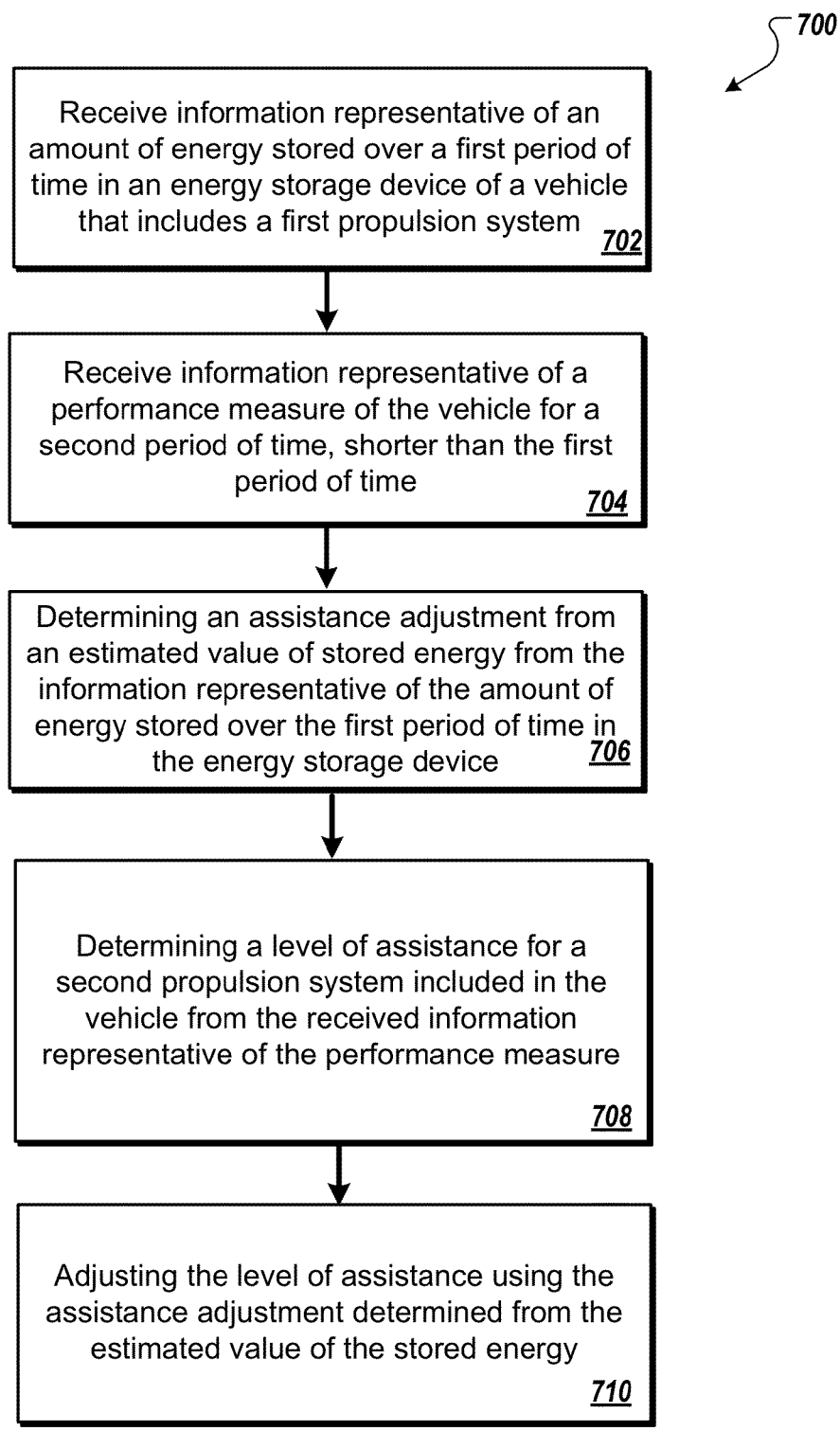
FIG. 7 is a flow chart of representative operations for an assistance manager.

Referring to FIG. 7, a flowchart 700 represents operations of a computing device such as a controller (e.g., the controller 104 shown in FIG. 1) executing an assistance manager 102 (also shown in FIG. 1) for managing the level of assistance for an alternative fuel propulsion system (e.g., an electric motor), e.g., to provide to a combustion engine, recharging an energy source (e.g., a battery), etc. for improving operations of a vehicle. Such operations, e.g., of the assistance manager 102, are typically executed by components (e.g., processors, etc.) included in a single computing device (e.g., a controller such as controller 104 onboard a vehicle, an off board computing device such as server 218 shown in FIG. 2); however, operations may be executed by multiple computing devices. Along with being executed at a single site (e.g., at the vehicle information manager 202, onboard a vehicle, etc.), operation execution may be distributed among two or more locations.

Operations may include receiving 702 information representative of an amount of energy stored over a first period of time in an energy storage device of a vehicle that includes a first propulsion system. For example, a vehicle such as a hybrid vehicle may include a combustion engine and one or more batteries for powering an electric motor (used to assist operations of the combustion engine). Information received may represent the state of charge of the one or more batteries included in the vehicle. Operations may also include, receiving 704 information representative of a performance measure of the vehicle for a second period of time, shorter than the first period of time. For example, as the vehicle is being operated the instantaneous MPG, gallons-used-per-minute, etc. may be received (e.g., in a time series of data) from the vehicle. Operations may also include, determining 706 an assistance adjustment from an estimated value of stored energy from the information representative of the amount of energy stored over the first period of time in the energy storage device. For example, from a time series of data that represents the amount of charge present on the battery (or batteries) over a time period, an average charge state may be calculated for the period of time. Similar types of statistics may also be calculated, for example, a median or mode of the charge state over the time period may be calculated. From the estimated value an assistance adjustment (e.g., a percentage adjustment) may be calculated. Operations may also include determining 708 a level of assistance for a second propulsion system in the vehicle from the received information representative of the performance measure. For example, by using a look-up table or another technique, a level of assistance (e.g., a percentage that represents the amount the electric motor of a vehicle needs to assist a combustion engine of the vehicle) may be determined from a performance measure (e.g., instantaneous MPG) provided by the vehicle. Operations may also include adjusting 710 the level of assistance using the assistance adjustment determined from the estimated value of the stored energy. For example, based upon the average charge state of the battery (or batteries) included in the vehicle, the level of assistance that the electric motor may provide the combustion engine may be adjusted. As such, in some situations, additional assistance may be provided by the electric motor without over-depleting the vehicle's battery (or batteries). Alternatively, the level of assistance may be reduced, for example, to allow for the vehicle battery to appropriately recharge and then allow for the level of assistance to potentially adjust for the electric motor to improve fuel efficiency.

Figure 8:
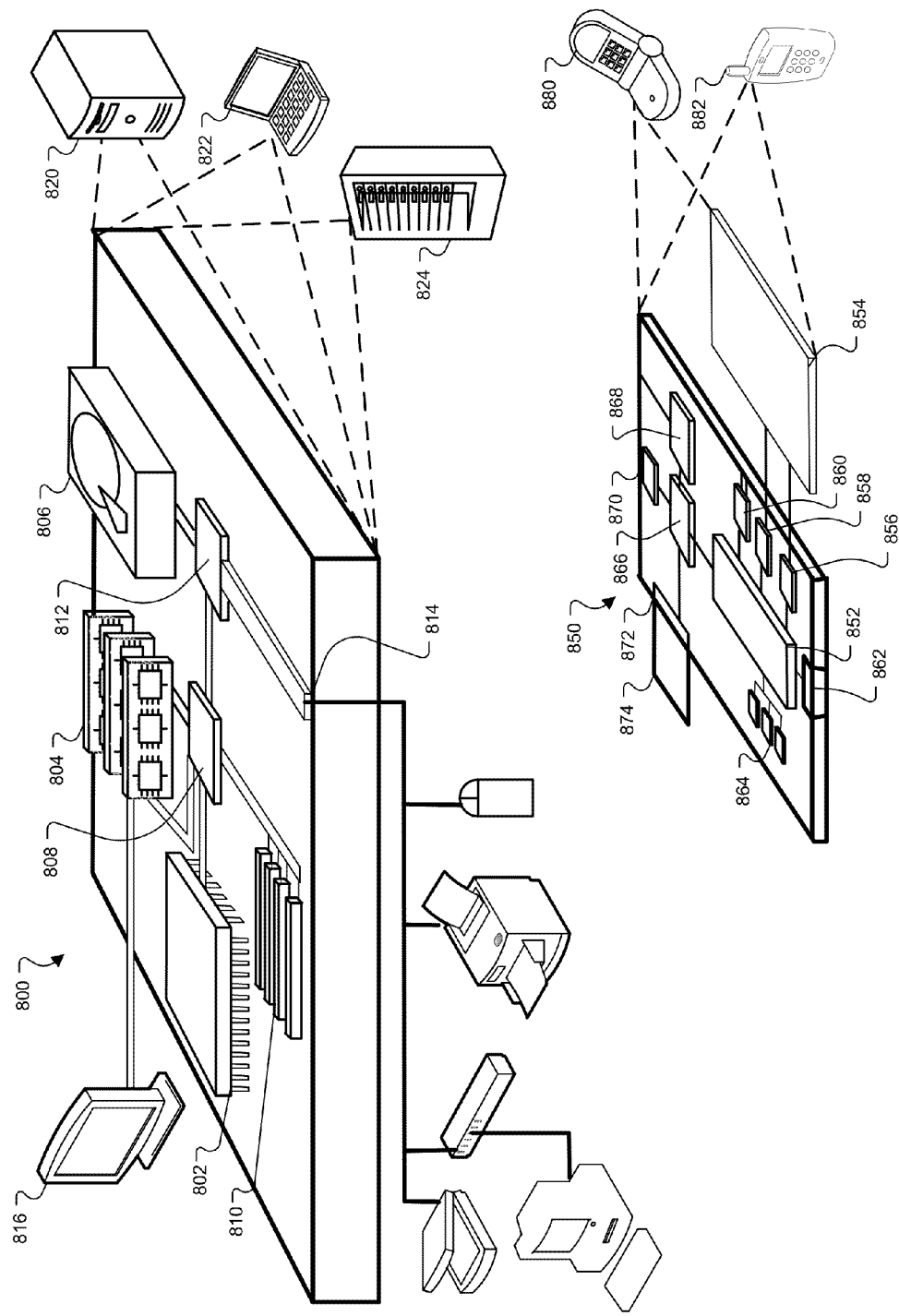
FIG. 8 is a block diagram of computing devices and systems.

FIG. 8 shows an example of example computer device 800 and example mobile computer device 850, which can be used to implement the techniques described herein. For example, a portion or all of the operations of an assistance manager (e.g., the assistance manger 102 shown in FIG. 1, the assistance manager 214 shown in FIG. 2, etc.) may be executed by the computer device 800 and/or the mobile computer device 850. Computing device 800 is intended to represent various forms of digital computers, including, e.g., laptops, desktops, workstations, personal digital assistants, servers, blade servers, mainframes, and other appropriate computers. Computing device 850 is intended to represent various forms of mobile devices, including, e.g., personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 800 includes processor 802, memory 804, storage device 806, high-speed interface 808 connecting to memory 804 and high-speed expansion ports 810, and low speed interface 812 connecting to low speed bus 814 and storage device 806. Each of components 802, 804, 806, 808, 810, and 812, are interconnected using various busses, and can be mounted on a common motherboard or in other manners as appropriate. Processor 802 can process instructions for execution within computing device 800, including instructions stored in memory 804 or on storage device 806 to display graphical data for a GUI on an external input/output device, including, e.g., display 816 coupled to high speed interface 808. In other implementations, multiple processors and/or multiple buses can be used, as appropriate, along with multiple memories and types of memory. Also, multiple computing devices 800 can be connected, with each device providing portions of the necessary operations (e.g., as a server bank, a group of blade servers, or a multi-processor system).

Memory 804 stores data within computing device 800. In one implementation, memory 804 is a volatile memory unit or units. In another implementation, memory 804 is a non-volatile memory unit or units. Memory 804 also can be another form of computer-readable medium, including, e.g., a magnetic or optical disk.

Storage device 806 is capable of providing mass storage for computing device 800. In one implementation, storage device 806 can be or contain a computer-readable medium, including, e.g., a floppy disk device, a hard disk device, an optical disk device, or a tape device, a flash memory or other similar solid state memory device, or an array of devices, including devices in a storage area network or other configurations. A computer program product can be tangibly embodied in a data carrier. The computer program product also can contain instructions that, when executed, perform one or more methods, including, e.g., those described above. The data carrier is a computer- or machine-readable medium, including, e.g., memory 804, storage device 806, memory on processor 802, and the like.

High-speed controller 808 manages bandwidth-intensive operations for computing device 800, while low speed controller 812 manages lower bandwidth-intensive operations. Such allocation of functions is an example only. In one implementation, high-speed controller 808 is coupled to memory 804, display 816 (e.g., through a graphics processor or accelerator), and to high-speed expansion ports 810, which can accept various expansion cards (not shown). In the implementation, low-speed controller 812 is coupled to storage device 806 and low-speed expansion port 814. The low-speed expansion port, which can include various communication ports (e.g., USB, Bluetooth®, Ethernet, wireless Ethernet), can be coupled to one or more input/output devices, including, e.g., a keyboard, a pointing device, a scanner, or a networking device including, e.g., a switch or router, e.g., through a network adapter.

Computing device 800 can be implemented in a number of different forms, as shown in the figure. For example, it can be implemented as standard server 820, or multiple times in a group of such servers. It also can be implemented as part of rack server system 824. In addition or as an alternative, it can be implemented in a personal computer including, e.g., laptop computer 822. In some examples, components from computing device 800 can be combined with other components in a mobile device (not shown), including, e.g., device 850. Each of such devices can contain one or more of computing device 800, 850, and an entire system can be made up of multiple computing devices 800, 850 communicating with each other.

Computing device 850 includes processor 852, memory 864, an input/output device including, e.g., display 854, communication interface 866, and transceiver 868, among other components. Device 850 also can be provided with a storage device, including, e.g., a microdrive or other device, to provide additional storage. Each of components 850, 852, 864, 854, 866, and 868, are interconnected using various buses, and several of the components can be mounted on a common motherboard or in other manners as appropriate.

Processor 852 can execute instructions within computing device 850, including instructions stored in memory 864. The processor can be implemented as a chipset of chips that include separate and multiple analog and digital processors. The processor can provide, for example, for coordination of the other components of device 850, including, e.g., control of user interfaces, applications run by device 850, and wireless communication by device 850.

Processor 852 can communicate with a user through control interface 858 and display interface 856 coupled to display 854. Display 854 can be, for example, a TFT LCD (Thin-Film-Transistor Liquid Crystal Display) or an OLED (Organic Light Emitting Diode) display, or other appropriate display technology. Display interface 856 can comprise appropriate circuitry for driving display 854 to present graphical and other data to a user. Control interface 858 can receive commands from a user and convert them for submission to processor 852. In addition, external interface 862 can communicate with processor 842, so as to enable near area communication of device 850 with other devices. External interface 862 can provide, for example, for wired communication in some implementations, or for wireless communication in other implementations, and multiple interfaces also can be used.

Memory 864 stores data within computing device 850. Memory 864 can be implemented as one or more of a computer-readable medium or media, a volatile memory unit or units, or a non-volatile memory unit or units. Expansion memory 874 also can be provided and connected to device 850 through expansion interface 872, which can include, for example, a SIMM (Single In Line Memory Module) card interface. Such expansion memory 874 can provide extra storage space for device 850, or also can store applications or other data for device 850. Specifically, expansion memory 874 can include instructions to carry out or supplement the processes described above, and can include secure data also. Thus, for example, expansion memory 874 can be provided as a security module for device 850, and can be programmed with instructions that permit secure use of device 850. In addition, secure applications can be provided through the SIMM cards, along with additional data, including, e.g., placing identifying data on the SIMM card in a non-hackable manner.

The memory can include, for example, flash memory and/or NVRAM memory, as discussed below. In one implementation, a computer program product is tangibly embodied in a data carrier. The computer program product contains instructions that, when executed, perform one or more methods, including, e.g., those described above. The data carrier is a computer- or machine-readable medium, including, e.g., memory 864, expansion memory 874, and/or memory on processor 852, which can be received, for example, over transceiver 868 or external interface 862.

Device 850 can communicate wirelessly through communication interface 866, which can include digital signal processing circuitry where necessary. Communication interface 866 can provide for communications under various modes or protocols, including, e.g., GSM voice calls, SMS, EMS, or MMS messaging, CDMA, TDMA, PDC, WCDMA, CDMA2000, or GPRS, among others. Such communication can occur, for example, through radio-frequency transceiver 868. In addition, short-range communication can occur, including, e.g., using a Bluetooth®, WiFi, or other such transceiver (not shown). In addition, GPS (Global Positioning System) receiver module 870 can provide additional navigation- and location-related wireless data to device 850, which can be used as appropriate by applications running on device 850.

Device 850 also can communicate audibly using audio codec 860, which can receive spoken data from a user and convert it to usable digital data. Audio codec 860 can likewise generate audible sound for a user, including, e.g., through a speaker, e.g., in a handset of device 850. Such sound can include sound from voice telephone calls, can include recorded sound (e.g., voice messages, music files, and the like) and also can include sound generated by applications operating on device 850.

Computing device 850 can be implemented in a number of different forms, as shown in the figure. For example, it can be implemented as cellular telephone 880. It also can be implemented as part of smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying data to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engines described herein can be separated, combined or incorporated into a single or combined engine. The engines depicted in the figures are not intended to limit the systems described here to the software architectures shown in the figures.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A computing device-implemented method comprising:
   receiving information representative of an amount of electrical energy stored over a first period of time in an electrical energy storage device of a hybrid vehicle that includes a combustion engine;
   receiving information representative of a performance measure of the hybrid vehicle for a second period of time, shorter than the first period of time;
   determining, by a processor, an assistance adjustment from an estimated value of stored electrical energy from the information representative of the amount of electrical energy stored over the first period of time in the electrical energy storage device;
   determining a level of assistance for an electric motor based system included in the hybrid vehicle from the received information representative of the performance measure; and
   adjusting the level of assistance using the assistance adjustment determined from the estimated value of the stored electrical energy.

2. The computing device-implemented method of claim 1, wherein determining the assistance adjustment from the estimated value of stored electrical energy is executed internal to the hybrid vehicle.

3. The computing device-implemented method of claim 1, wherein determining the level of assistance for the electric motor based system is executed internal to the hybrid vehicle.

4. The computing device-implemented method of claim 1, wherein the performance measure represents miles-per-gallon.

5. The computing device-implemented method of claim 1, wherein the performance measure represents instantaneous miles-per-gallon.

6. The computing device-implemented method of claim 1, wherein the amount of electrical energy stored over the first period of time in the electrical energy storage device represents the charge of a battery included in the hybrid vehicle.

7. The computing device-implemented method of claim 1, wherein the level of assistance for the electric motor based system represents a level of assistance for an alternative fuel propulsion system.

8. The computing device-implemented method of claim 1, wherein the level of assistance for the electric motor based system represents recharging an energy storage device.

9. A system comprising:
   a computing device comprising:
      a memory configured to store instructions; and
      a processor to execute the instructions to perform operations comprising:
         receiving information representative of an amount of electrical energy stored over a first period of time in an electrical energy storage device of a hybrid vehicle that includes a combustion engine;
         receiving information representative of a performance measure of the hybrid vehicle for a second period of time, shorter than the first period of time;

determining an assistance adjustment from an estimated value of stored electrical energy from the information representative of the amount of electrical energy stored over the first period of time in the electrical energy storage device;

determining a level of assistance for an electric motor based system included in the hybrid vehicle from the received information representative of the performance measure; and adjusting the level of assistance using the assistance adjustment determined from the estimated value of the stored electrical energy.

10. The system of claim 9, wherein determining the assistance adjustment from the estimated value of stored electrical energy is executed internal to the hybrid vehicle.

11. The system of claim 9, wherein determining the level of assistance for the electric motor based system is executed internal to the hybrid vehicle.

12. The system of claim 9, wherein the performance measure represents miles-per-gallon.

13. The system of claim 9, wherein the performance measure represents instantaneous miles-per-gallon.

14. The system of claim 9, wherein the amount of electrical energy stored over the first period of time in the electrical energy storage device represents the charge of a battery included in the hybrid vehicle.

15. The system of claim 9, wherein the level of assistance for the electric motor based system represents a level of assistance for an alternative fuel propulsion system.

16. The system of claim 9, wherein the level of assistance for the electric motor based system represents recharging an energy storage device.

17. One or more computer readable non-transitory media storing instructions that are executable by a processing device, and upon such execution cause the processing device to perform operations comprising:

receiving information representative of an amount of electrical energy stored over a first period of time in an electrical energy storage device of a hybrid vehicle that includes a combustion engine;

receiving information representative of a performance measure of the hybrid vehicle for a second period of time, shorter than the first period of time;

determining an assistance adjustment from an estimated value of stored electrical energy from the information representative of the amount of electrical energy stored over the first period of time in the electrical energy storage device;

determining a level of assistance for an electric motor based system included in the hybrid vehicle from the received information representative of the performance measure; and adjusting the level of assistance using the assistance adjustment determined from the estimated value of the stored electrical energy.

18. The computer readable media of claim 17, wherein determining the assistance adjustment from the estimated value of stored electrical energy is executed internal to the hybrid vehicle.

19. The computer readable media of claim 17, wherein determining the level of assistance for the electric motor based system is executed internal to the hybrid vehicle.

20. The computing device-implemented method of claim 17, wherein the performance measure represents miles-per-gallon.

21. The computing device-implemented method of claim 17, wherein the performance measure represents instantaneous miles-per-gallon.

22. The computer readable media of claim 17, wherein the amount of electrical energy stored over the first period of time in the electrical energy storage device represents the charge of a battery included in the hybrid vehicle.

23. The computer readable media of claim 17, wherein the level of assistance for the electric motor based system represents a level of assistance for an alternative fuel propulsion system.

24. The computer readable media of claim 17, wherein the level of assistance for the electric motor based system represents recharging an energy storage device.

* * * * *